UNITED STATES PATENT OFFICE.

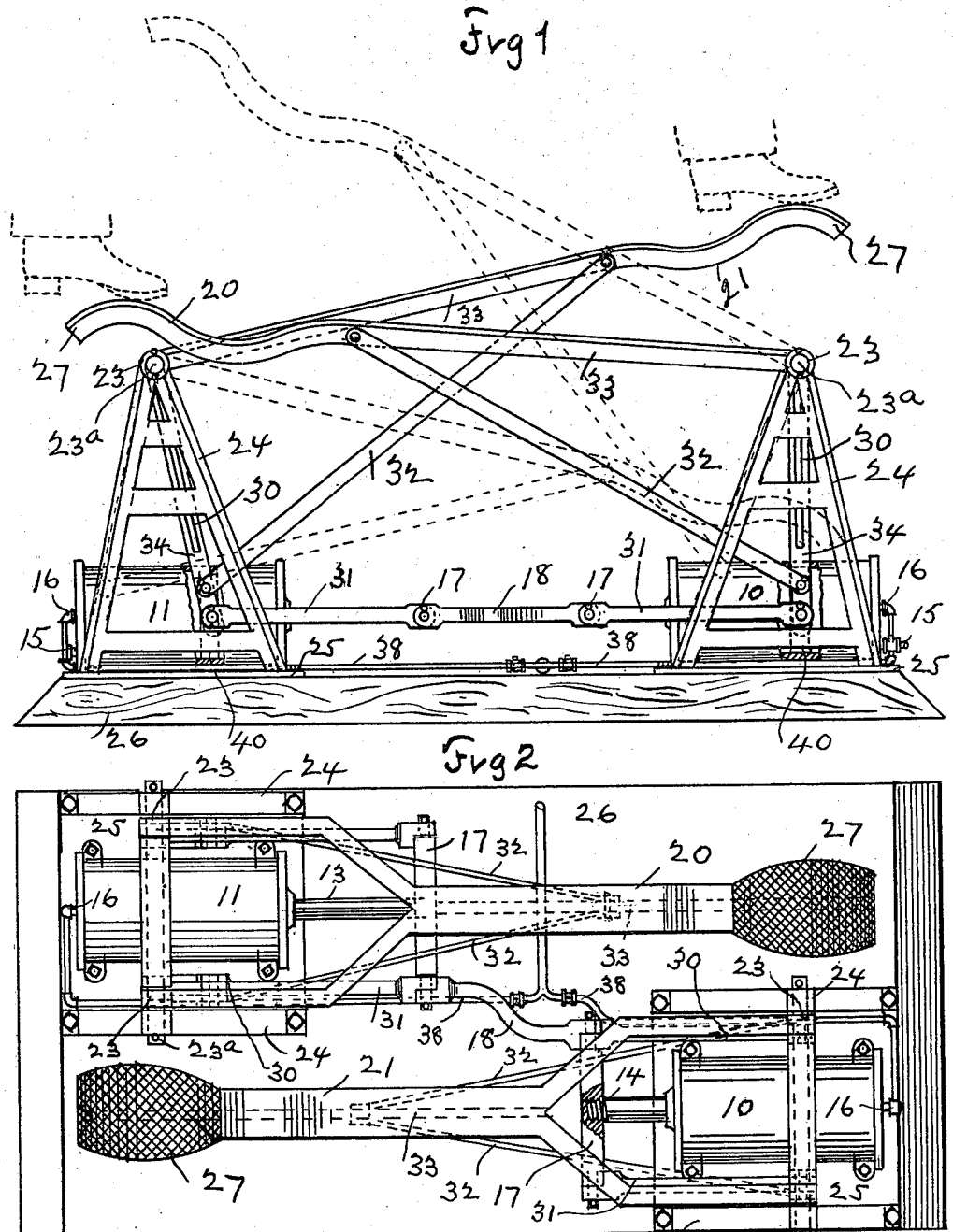

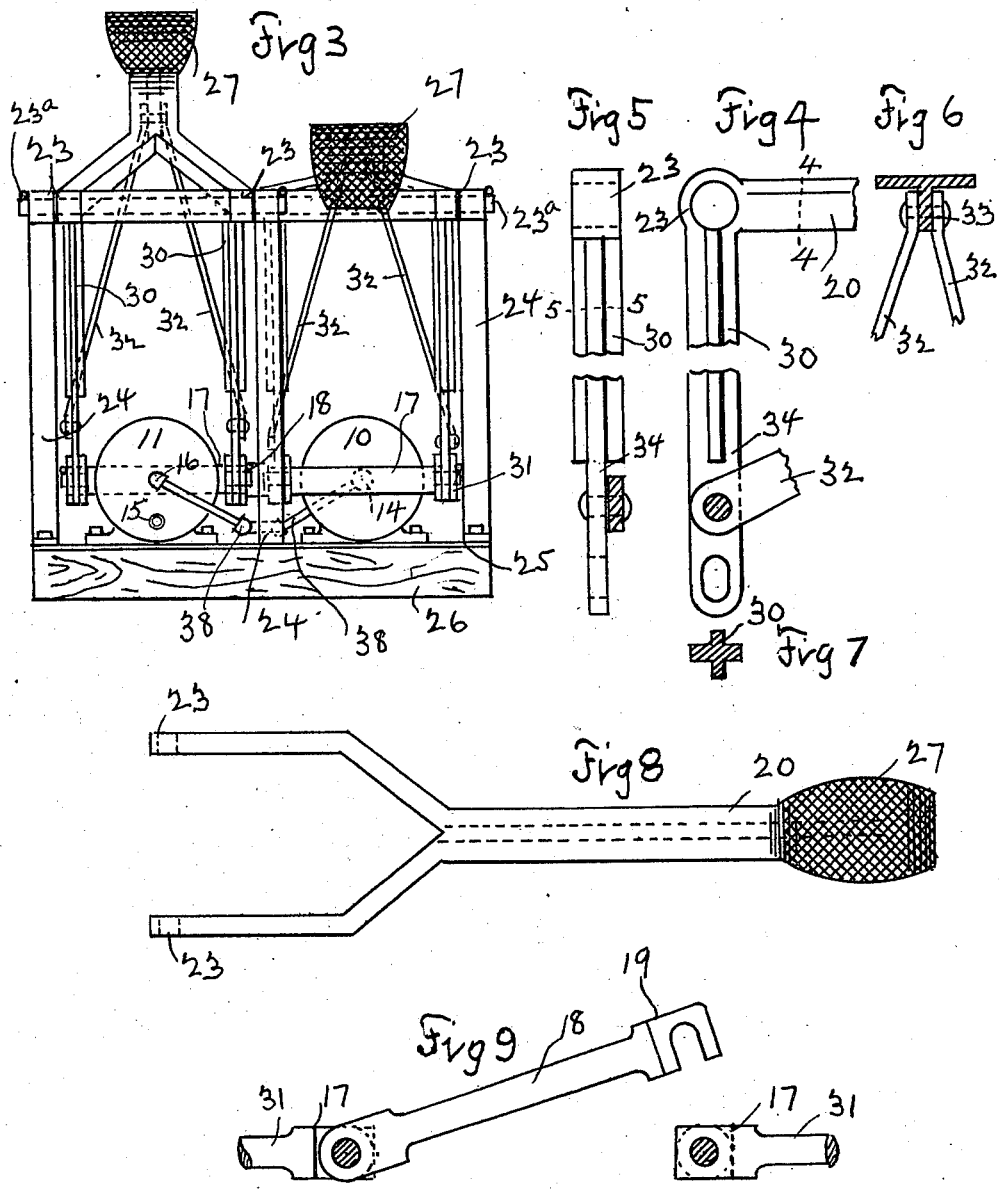

JOHN J. REDDY, OF JERSEY CITY, NEW JERSEY.

AUTOMOBILE TIRE-PUMP.

996,882.   Specification of Letters Patent.   Patented July 4, 1911.

Application filed August 30, 1910. Serial No. 579,667.

*To all whom it may concern:*

Be it known that I, JOHN J. REDDY, citizen of the United States, and resident of Jersey City, in the county of Hudson and State of New Jersey, have invented certain new and useful Improvements in Automobile Tire-Pumps, of which the following is a specification.

My invention relates to air pumps, especially pneumatic tire pumps, and the object is to provide this class of pumps with mechanism for operating the said pumps by the movements of the operator's feet after the manner of walking.

My invention consists of the arrangement and combination of certain specially constructed parts especially adapted to carry out the principle of my invention.

Referring to the drawings, Figure 1 is a side elevation of my invention. Fig. 2 is a plan view of the same. Fig. 3 is an end view of the same. Fig. 4 is an enlarged detached side view of one of the pedal levers partly broken away. Fig. 5 is an end view of Fig. 4. Fig. 6 is a cross section on line 4— Fig. 4, showing how stay rods are attached to lever. Fig. 7 is a cross section on line 5— Fig. 5. Fig. 8 is a detached top view of one of the pedal levers. Fig. 9 is an enlarged side view of the link, showing same raised to show the hook end thereof.

Numerals 10—12 represent two air pumps, which may be of any size and shape. Each of the cylinders of the pumps have the usual piston 40, piston-rods 13—14, inlet opening 15 and outlet 16. The piston rods 13—14 are securely attached (by any means) to cross heads 17, and the two heads are joined together by a detachable link 18. That is, one end of the link is securely pivoted to one head, and the other end loosely connected to the other head (see Fig. 9) by reason of which, one end of the link is provided with a hook connection 19 (see Fig. 9.) The object of this construction will be described farther on.

20—21 are two pedal levers, one for each pump. Each of these levers are fulcrumed at 23 on a shaft 23ᵃ between a pair of upright A frames or standards 24, cast on the bed plate 25 which is secured to a timber 26 or a flooring as the case may be. The shaft 23ᵃ has bearing supports on said A frames. These pedal levers are shaped as shown in Figs. 1—8. The outer ends, 27, are formed into foot rests, and the rear fulcrum portions 23 are forked as shown in Fig. 8. This portion of each lever comprises the long member of the same. Cast integral with the forked portions 23 of each lever, are two short vertical or downward inclined members 30 (see Figs. 3—4—5) preferably made as shown in Fig. 7 in cross section. The lower ends of each of these vertical arms, 30, of the pedal levers, are pivotally connected to one end of the link bars 31. The other ends of said bar, 31, are pivotally connected to the cross heads 17 (see Fig. 2).

To strengthen the pedal levers, I employ stay bars or rods, 32, two for each lever. (See Figs. 2—3.) These stay rods are fastened at one end to the flanges, 33, of the levers, one on each side thereof (see Figs. 4—5). From this connecting point the rods extend downwardly on an angle until they reach the flanges, 34, of the short members, 30, of the pedal levers (see Fig. 3) where they are fastened to said member. The air is conducted from the pumps to any convenient point, by pipes 38 provided with suitable check valves.

The operation of my invention is as follows: The operator places one foot on pedal lever, 20, and the other foot on pedal lever 21 (see dotted lines Fig. 1). Now by steadying his body and moving his feet as in the act of walking, the operator will have the tendency to depress one lever and raise the other, or vice versa. As the levers rise and fall (as shown in dotted lines Fig. 1) they will, through their short members, 30, and bars 31, cross heads 17, and link 18, operate the pistons 14 of each pump and force the compressed air to the desired point for tires or other uses.

If only one pump is required to be used, then the other pump is disconnected therefrom. And this is done by simply uncoupling one end of the link 18 (as shown in Fig. 9). This allows only one pump to act.

The pedal levers can be operated by hand if desired. Any suitable means may be employed to lock the levers on their fulcrum points. By disconnecting the link 18, I am able to allow both pedal-levers to be dropped down their full movement, thereby making it more convenient to transport the apparatus. This walking action operation of the pumps tends to produce greater power with the least physical exertion. In some cases I may use a stop to limit the downward movements of each pedal lever; said stop may be a vertical post secured on the base under each lever.

What I claim is:

1. In an air pump the mechanism for operating the same with foot power, similar to walking, comprising two pedal levers, each with vertical members and a horizontal member, a pair of A standards between and upon which said levers are fulcrumed, link bars pivoted in pairs to the short member of each lever, and also to the cross head of each pump, strengthening rods, pivoted to horizontal members and also to the short members of said lever, means for connecting the cross heads of said pumps.

2. In an air pump, the mechanism for operating the same with a walking action pedal power, comprising two pedal levers, each with a forked horizontal member and two short members, a pair of A frames, said levers pivotally mounted to operate between said pair of A frames, cross heads each slidably connected to a pump, a pair of link bars pivotally connected to each cross head, and also connected to the short members of each pedal lever, means of strengthening said pedal levers, and means for connecting said cross heads consisting of a link bar, so that the action of the levers will be coöperative upon the pumps.

3. In an air pump, mechanism for operating same, comprising two pedal levers, having each two vertical members and a horizontal member with foot rest and forked end, a pair of A standards between which said levers are fulcrumed, two link bars pivoted to the said short members of levers, said bars pivoted to cross heads, said cross heads connected to the piston rods of the pumps, said cross head of each pump connected together by a detachable link for the purpose of causing one pedal lever to operate both pumps.

Signed at Jersey City in the county of Hudson and State of New Jersey this 27 day of August A. D. 1910.

JOHN J. REDDY.

Witnesses:
  Q. BARRITT,
  JOHN H. VERE.

---

Copies of this patent may be obtained for five cents each, by addressing the "Commissioner of Patents, Washington, D. C."